United States Patent
Burke et al.

(10) Patent No.: US 10,977,487 B2
(45) Date of Patent: *Apr. 13, 2021

(54) METHOD AND SYSTEM FOR CONVEYING DATA FROM MONITORED SCENE VIA SURVEILLANCE CAMERAS

(71) Applicant: Sensormatic Electronics, LLC, Boca Raton, FL (US)

(72) Inventors: Anthony Burke, Noblesville, IN (US); Kenneth Miller, Noblesville, IN (US)

(73) Assignee: SENSORMATIC ELECTRONICS, LLC, Boca Raton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/939,461

(22) Filed: Mar. 29, 2018

(65) Prior Publication Data
US 2018/0218209 A1 Aug. 2, 2018

Related U.S. Application Data

(63) Continuation of application No. 15/076,712, filed on Mar. 22, 2016, now Pat. No. 9,965,680.

(51) Int. Cl.
*G06K 9/00* (2006.01)
*G06Q 10/10* (2012.01)
(Continued)

(52) U.S. Cl.
CPC ......... *G06K 9/00496* (2013.01); *G06F 16/51* (2019.01); *G06F 16/58* (2019.01);
(Continued)

(58) Field of Classification Search
CPC ............ G06K 9/00496; G06K 9/00771; G06F 17/30265; G06F 17/3028; G06Q 10/10; G08B 13/19697
See application file for complete search history.

(56) References Cited

U.S. PATENT DOCUMENTS 3,217,098 A 11/1965 Oswald
4,940,925 A 7/1990 Wand et al.
(Continued)

FOREIGN PATENT DOCUMENTS

EP 2 164 003 A1 3/2010
EP 2 538 672 A1 12/2012
(Continued)

OTHER PUBLICATIONS

International Search Report and the Written Opinion of the International Searching Authority, dated May 31, 2017, from International Application No. PCT/US2017/023430, filed Mar. 21, 2017. Fourteen pages.

(Continued)

*Primary Examiner* — Amara Abdi
(74) *Attorney, Agent, or Firm* — HoustonHogle LLP

(57) ABSTRACT

A system and method for monitoring sensors via surveillance cameras is disclosed. In the system, surveillance cameras generating image data of scenes, where the sensors are included in the scenes. The sensors detect information concerning the scenes and encode the information so that it can be derived from the image data. Preferably, the sensors encode the information concerning the scenes by modulating a visible light source, the signals of which are captured within the image data by the cameras. An analytics system then analyzes the image data and decodes the information from the sensors encoded within the image data. Preferably, an integrated analytics system of the cameras executes the analysis. Exemplary sensors include sensors for detecting temperature, moisture, audio/voice, and product selection in a retail premises.

20 Claims, 4 Drawing Sheets

(51) Int. Cl.
  *G06F 16/51* (2019.01)
  *G06F 16/58* (2019.01)
  *G08B 13/196* (2006.01)
(52) U.S. Cl.
  CPC ......... *G06K 9/00771* (2013.01); *G06Q 10/10* (2013.01); *G08B 13/19645* (2013.01); *G08B 13/19671* (2013.01); *G08B 13/19663* (2013.01); *G08B 13/19697* (2013.01)

(56) References Cited

U.S. PATENT DOCUMENTS

| | | |
|---|---|---|
| 5,164,827 A | 11/1992 | Paff |
| 5,204,536 A | 4/1993 | Vardi |
| 5,317,394 A | 5/1994 | Hale et al. |
| 5,729,471 A | 3/1998 | Jain et al. |
| 5,850,352 A | 12/1998 | Moezzi et al. |
| 5,940,538 A | 8/1999 | Spiegel et al. |
| 5,951,695 A | 9/1999 | Kolovson |
| 5,969,755 A | 10/1999 | Courtney |
| 6,341,183 B1 | 1/2002 | Goldberg |
| 6,359,647 B1 | 3/2002 | Sengupta et al. |
| 6,581,000 B2 | 6/2003 | Hills et al. |
| 6,643,795 B1 | 11/2003 | Sicola et al. |
| 6,724,421 B1 | 4/2004 | Glatt |
| 6,812,835 B2 | 11/2004 | Ito et al. |
| 6,970,083 B2 | 11/2005 | Venetianer et al. |
| 7,091,949 B2 | 8/2006 | Hansen |
| 7,242,423 B2 | 7/2007 | Lin |
| 7,286,157 B2 | 10/2007 | Buehler |
| 7,342,489 B1 | 3/2008 | Milinusic et al. |
| 7,382,244 B1 | 6/2008 | Donovan et al. |
| 7,409,076 B2 | 8/2008 | Brown et al. |
| 7,428,002 B2 | 9/2008 | Monroe |
| 7,450,735 B1 | 11/2008 | Shah et al. |
| 7,456,596 B2 | 11/2008 | Goodall et al. |
| 7,460,149 B1 | 12/2008 | Donovan et al. |
| 7,529,388 B2 | 5/2009 | Brown et al. |
| 7,623,152 B1 | 11/2009 | Kaplinsky |
| 7,623,676 B2 | 11/2009 | Zhao et al. |
| 7,733,375 B2 | 6/2010 | Mahowald |
| 7,996,718 B1 | 8/2011 | Ou et al. |
| 8,249,301 B2 | 8/2012 | Brown et al. |
| 8,300,102 B2 | 10/2012 | Nam et al. |
| 8,325,979 B2 | 12/2012 | Taborowski et al. |
| 8,482,609 B1 | 7/2013 | Mishra et al. |
| 8,483,490 B2 | 7/2013 | Brown et al. |
| 8,502,868 B2 | 8/2013 | Buehler et al. |
| 8,528,019 B1 | 9/2013 | Dimitrova et al. |
| 8,558,907 B2 * | 10/2013 | Goh ................. H04N 13/20 348/218.1 |
| 8,594,482 B2 | 11/2013 | Fan et al. |
| 8,675,074 B2 | 3/2014 | Salgar et al. |
| 8,723,952 B1 | 5/2014 | Rozenboim |
| 8,849,764 B1 | 9/2014 | Long et al. |
| 8,995,712 B2 | 3/2015 | Huang et al. |
| 9,015,167 B1 | 4/2015 | Ballou et al. |
| 9,058,520 B2 | 6/2015 | Xie et al. |
| 9,094,615 B2 | 7/2015 | Aman et al. |
| 9,129,179 B1 | 9/2015 | Wong |
| 9,158,975 B2 | 10/2015 | Lipton et al. |
| 9,168,882 B1 | 10/2015 | Mirza et al. |
| 9,197,861 B2 | 11/2015 | Saptharishi et al. |
| 9,280,833 B2 | 3/2016 | Brown et al. |
| 9,412,269 B2 | 8/2016 | Saptharishi et al. |
| 9,495,614 B1 * | 11/2016 | Boman ................. G06K 9/6267 |
| 9,594,963 B2 | 3/2017 | Bobbitt et al. |
| 9,641,763 B2 | 5/2017 | Bernal et al. |
| 9,674,458 B2 | 6/2017 | Teich et al. |
| 9,785,898 B2 | 10/2017 | Hofman et al. |
| 9,860,554 B2 | 1/2018 | Samuelsson et al. |
| 9,965,680 B2 | 5/2018 | Burke et al. |
| 9,967,446 B2 | 5/2018 | Park |
| 2002/0104098 A1 | 8/2002 | Zustak et al. |
| 2003/0093580 A1 | 5/2003 | Thomas et al. |
| 2003/0093794 A1 | 5/2003 | Thomas et al. |
| 2003/0101104 A1 | 5/2003 | Dimitrova et al. |
| 2003/0107592 A1 | 6/2003 | Li et al. |
| 2003/0107649 A1 | 6/2003 | Flickner et al. |
| 2003/0163816 A1 | 8/2003 | Gutta et al. |
| 2003/0169337 A1 | 9/2003 | Wilson et al. |
| 2004/0025180 A1 | 2/2004 | Begeja et al. |
| 2005/0012817 A1 | 1/2005 | Hampapur et al. |
| 2005/0057653 A1 | 3/2005 | Maruya |
| 2006/0001742 A1 | 1/2006 | Park |
| 2006/0165379 A1 | 7/2006 | Agnihotri et al. |
| 2006/0173856 A1 | 8/2006 | Jackson et al. |
| 2006/0181612 A1 | 8/2006 | Lee et al. |
| 2006/0239645 A1 | 10/2006 | Curtner et al. |
| 2006/0243798 A1 | 11/2006 | Kundu et al. |
| 2007/0178823 A1 * | 8/2007 | Aronstam ............ F24F 11/0001 454/256 |
| 2007/0182818 A1 | 8/2007 | Buehler |
| 2007/0245379 A1 | 10/2007 | Agnihortri |
| 2007/0279494 A1 | 12/2007 | Aman et al. |
| 2007/0294207 A1 * | 12/2007 | Brown ................. G06F 16/784 |
| 2008/0004036 A1 | 1/2008 | Bhuta et al. |
| 2008/0101789 A1 * | 5/2008 | Sharma ............. G08B 13/1963 396/427 |
| 2008/0114477 A1 * | 5/2008 | Wu ....................... G10L 19/008 700/94 |
| 2008/0158336 A1 | 7/2008 | Benson et al. |
| 2009/0006368 A1 | 1/2009 | Mei et al. |
| 2009/0237508 A1 | 9/2009 | Arpa et al. |
| 2009/0268033 A1 | 10/2009 | Ukita |
| 2009/0273663 A1 * | 11/2009 | Yoshida ............... H04N 13/189 348/43 |
| 2009/0284601 A1 | 11/2009 | Eledath et al. |
| 2010/0013917 A1 | 1/2010 | Hanna et al. |
| 2010/0038417 A1 * | 2/2010 | Blankitny ............. G06Q 30/02 235/375 |
| 2010/0110212 A1 | 5/2010 | Kuwahara et al. |
| 2010/0153182 A1 * | 6/2010 | Quinn .................... G06Q 99/00 705/14.4 |
| 2010/0232288 A1 | 9/2010 | Coatney et al. |
| 2011/0043631 A1 | 2/2011 | Marman et al. |
| 2011/0128384 A1 * | 6/2011 | Tiscareno ............... H04N 5/332 348/164 |
| 2011/0246626 A1 | 10/2011 | Peterson et al. |
| 2011/0289119 A1 | 11/2011 | Hu et al. |
| 2011/0289417 A1 | 11/2011 | Schaefer et al. |
| 2011/0320861 A1 | 12/2011 | Bayer et al. |
| 2012/0017057 A1 | 1/2012 | Higuchi et al. |
| 2012/0072420 A1 * | 3/2012 | Moganti ............... G06F 16/748 707/737 |
| 2012/0098969 A1 | 4/2012 | Wengrovitz et al. |
| 2012/0206605 A1 | 8/2012 | Buehler et al. |
| 2012/0226526 A1 * | 9/2012 | Donovan ............... H04N 7/181 705/7.36 |
| 2013/0115879 A1 * | 5/2013 | Wilson ................. H04M 1/7253 455/41.1 |
| 2013/0166711 A1 | 6/2013 | Wang et al. |
| 2013/0169801 A1 | 7/2013 | Martin et al. |
| 2013/0223625 A1 | 8/2013 | de Waal et al. |
| 2013/0278780 A1 | 10/2013 | Cazier et al. |
| 2013/0343731 A1 | 12/2013 | Pashkevich et al. |
| 2014/0085480 A1 | 3/2014 | Saptharishi |
| 2014/0172627 A1 | 6/2014 | Levy et al. |
| 2014/0211018 A1 | 7/2014 | de Lima et al. |
| 2014/0218520 A1 * | 8/2014 | Teich ..................... H04N 5/2354 348/143 |
| 2014/0282991 A1 | 9/2014 | Watanabe et al. |
| 2014/0330729 A1 | 11/2014 | Colangelo |
| 2014/0362223 A1 | 12/2014 | LaCroix et al. |
| 2014/0375982 A1 * | 12/2014 | Jovicic .................. G01B 11/14 356/72 |
| 2015/0039458 A1 | 2/2015 | Reid |
| 2015/0092052 A1 * | 4/2015 | Shin ..................... G06K 9/00771 348/143 |
| 2015/0121470 A1 * | 4/2015 | Rongo ................. H04L 63/083 726/4 |
| 2015/0208040 A1 | 7/2015 | Chen et al. |
| 2015/0215583 A1 | 7/2015 | Chang |

(56) References Cited

U.S. PATENT DOCUMENTS

| | | |
|---|---|---|
| 2015/0244992 A1 | 8/2015 | Buehler |
| 2015/0249496 A1* | 9/2015 | Muijs .................. H05B 45/20 |
| | | 398/118 |
| 2015/0294119 A1 | 10/2015 | Gundam et al. |
| 2015/0358576 A1 | 12/2015 | Hirose et al. |
| 2015/0379729 A1 | 12/2015 | Datta et al. |
| 2015/0381946 A1 | 12/2015 | Renkis |
| 2016/0014381 A1 | 1/2016 | Rolf et al. |
| 2016/0065615 A1 | 3/2016 | Scanzano et al. |
| 2016/0224430 A1 | 8/2016 | Long et al. |
| 2016/0225121 A1 | 8/2016 | Gupta et al. |
| 2016/0269631 A1 | 9/2016 | Jiang et al. |
| 2016/0357648 A1 | 12/2016 | Keremane et al. |
| 2016/0379074 A1 | 12/2016 | Nielsen et al. |
| 2017/0193673 A1 | 7/2017 | Heidemann et al. |
| 2017/0277785 A1 | 9/2017 | Burke |
| 2017/0277947 A1 | 9/2017 | Burke et al. |
| 2017/0277967 A1 | 9/2017 | Burke et al. |
| 2017/0278137 A1 | 9/2017 | Burke |
| 2017/0278365 A1 | 9/2017 | Madar et al. |
| 2017/0278366 A1 | 9/2017 | Burke et al. |
| 2017/0278367 A1 | 9/2017 | Burke et al. |
| 2017/0278368 A1 | 9/2017 | Burke |
| 2017/0280043 A1 | 9/2017 | Burke et al. |
| 2017/0280102 A1 | 9/2017 | Burke |
| 2017/0280103 A1 | 9/2017 | Burke et al. |
| 2018/0076892 A1* | 3/2018 | Brilman ................. H04B 10/67 |

FOREIGN PATENT DOCUMENTS

| | | | | |
|---|---|---|---|---|
| JP | 2003-151048 | * | 5/2003 | .......... G01S 17/026 |
| JP | 2003-151048 A | | 5/2003 | |
| JP | 2010-074382 | * | 4/2010 | .............. H04N 7/18 |
| JP | 2010-074382 A | | 4/2010 | |
| WO | 2007030168 A1 | | 3/2007 | |
| WO | 2013141742 A1 | | 9/2013 | |
| WO | 2014114754 A1 | | 7/2014 | |

OTHER PUBLICATIONS

International Search Report and the Written Opinion of the International Searching Authority, dated Jun. 12, 2017, from International Application No. PCT/US2017/023440, filed on Mar. 21, 2017. Fourteen pages.

International Search Report and the Written Opinion of the International Searching Authority, dated Jun. 19, 2017, from International Application No. PCT/US2017/023436, filed on Mar. 21, 2017. Fourteen pages.

International Search Report and the Written Opinion of the International Searching Authority, dated Jun. 21, 2017, from International Application No. PCT/US2017/023444, filed on Mar. 21, 2017. Thirteen pages.

International Search Report and the Written Opinion of the International Searching Authority, dated Jun. 28, 2017, from International Application No. PCT/US2017/023434, filed on Mar. 21, 2017. Thirteen pages.

International Preliminary Report on Patentability, dated Oct. 4, 2018, from International Application No. PCT/US2017/023440, filed on Mar. 21, 2017. Eight pages.

International Preliminary Report on Patentability, dated Oct. 4, 2018, from International Application No. PCT/US2017/023434, filed on Mar. 21, 2017. Eight pages.

International Preliminary Report on Patentability, dated Oct. 4, 2018, from International Application No. PCT/US2017/023430, filed Mar. 21, 2017. Eight pages.

International Preliminary Report on Patentability, dated Oct. 4, 2018, from International Application No. PCT/US2017/023436, filed on Mar. 21, 2017. Eight pages.

International Preliminary Report on Patentability, dated Oct. 4, 2018, from International Application No. PCT/US2017/023444, filed on Mar. 21, 2017. Seven pages.

Weilin, L., et al., "Personalizaation of Trending Tweets Using Like-Dislike Caegory Model," Procedia Computer Science, 60: 236-245 (2015).

* cited by examiner

METHOD AND SYSTEM FOR CONVEYING DATA FROM MONITORED SCENE VIA SURVEILLANCE CAMERAS

RELATED APPLICATIONS

This application is a Continuation of U.S. application Ser. No. 15/076,712, filed on Mar. 22, 2016, which is incorporated herein by reference in its entirety.

This application is related to:

Application Ser. No. 15/076,701 filed on Mar. 22, 2016, entitled "Method and system for surveillance camera arbitration of uplink consumption," now U.S. Patent Publication No.: 2017/0278368;

Application Ser. No. 15/076,703 filed on Mar. 22, 2016, entitled "Method and system for pooled local storage by surveillance cameras," now U.S. Patent Publication No.: 2017/0280102;

U.S. application Ser. No. 15/076,704 filed on Mar. 22, 2016, entitled "System and method for designating surveillance camera regions of interest," now U.S. Patent Publication No.: 2017/0277967;

U.S. application Ser. No. 15/076,705 filed on Mar. 22, 2016, entitled "System and method for deadzone detection in surveillance camera network," now U.S. Patent Publication No.: 2017/0278366;

U.S. application Ser. No. 15/076,706 filed on Mar. 22, 2016, entitled "System and method for overlap detection in surveillance camera network," now U.S. Patent Publication No.: 2017/0278367;

U.S. application Ser. No. 15/076,708 filed on Mar. 22, 2016 entitled "System and method for retail customer tracking in surveillance camera network", now U.S. Patent Publication No.: 2017/0278137;

U.S. application Ser. No. 15/076,709 filed on Mar. 22, 2016, entitled "Method and system for modeling image of interest to users," now U.S. Patent Publication No.: 2017/0277785;

U.S. application Ser. No. 15/076,710 filed on Mar. 22, 2016, entitled "System and method for using mobile device of zone and correlated motion detection," now U.S. Patent Publication No.: 2017/0280103;

U.S. application Ser. No. 15/076,713 filed on Mar. 22, 2016, entitled "System and method for configuring surveillance cameras using mobile computing devices," now U.S. Patent Publication No.: 2017/0279365; and U.S. application Ser. No. 15/076,717 filed on Mar. 22, 2016, entitled "System and method for controlling surveillance cameras," now U.S. Patent Publication No.: 2017/0280043.

All of the afore-mentioned applications are incorporated herein by this reference in their entirety.

BACKGROUND OF THE INVENTION

Video surveillance systems are often deployed in schools, government buildings, small businesses, retail stores and corporate offices, and even many residences. These surveillance systems are typically comprised of surveillance cameras that capture image data, image data storage systems that store the image data along with possibly metadata, and increasingly analytics systems that analyze the image data and possibly generate the metadata.

The analytics systems are becoming increasingly powerful. Often, the analytics systems will track moving objects against fixed background models. More sophisticated functions include object detection to determine the presence of an object or classify the type of object or event. The analytics systems generate video primitives or metadata for the detected objects and events, which the analytics systems can further process or send over the data networks to other systems for storage and incorporation into the image data as metadata, for example.

While analytics systems have historically been separate systems apart from the surveillance cameras, the surveillance cameras themselves are increasingly providing this functionality. Integrating the analytics functionality within the cameras themselves has advantages. It eliminates the cost and maintenance associated with deploying a separate analytics system to accomplish the same objective, and enables more efficient analysis by eliminating the messaging overhead associated with sending the image data over the data network for analysis by the separate analytics systems.

SUMMARY OF THE INVENTION

With the increasing power of analytics systems, there are trends to integrate surveillance camera systems into larger systems associated with security and business functions. Nevertheless, it becomes difficult to propagate information between the different systems to fulfill possibly higher level functions. Moreover, it is always a challenge to deploy added sensing capabilities that may provide additional data that would improve the analytics powers of the systems and contribute information to the video analytics systems. Typically, different heterogeneous sensors must be located at different places in the premises. Moreover, data and power connections must typically be provided to those sensors.

In general, according to one aspect, the invention features a system for monitoring sensors. This system comprises surveillance cameras generating image data of scenes. Then, sensors are distributed in those scenes to detect information concerning the scenes. This information is then encoded so that it can be derived from the image data. An analytics system can then analyze the image data, and decode the information from the sensors.

In one example, the sensors can detect environmental information and then encode that environmental information. Examples include sensors that detect moisture or water, or temperature.

In other examples, the sensors detect security information and then encode that security information. One example here is that a sensor could monitor sounds for voice patterns characteristic of aggression. The sensors could then generate an alert that could be decoded by the analytics system.

It still other examples, the sensors could detect business information and then encode that business information. Here, a sensor could be deployed in the scene in order to detect merchandise and possibly the number of items on a shelf. This information could then be provided to and derived by the analytics system.

In one example, an image data storage system could be provided for storing the image data. The analytics system would then generate meta data from the decoded information and then store that metadata with the image data in the image data storage system.

There are a number of different ways of implementing the sensors. For example, the sensors could comprise modulated light source or sources that would encode the information by modulating light from the sources. The modulated light could even be generated in the infrared spectrum, outside the visible range.

In order to ensure robust communication of the information, the modulated light source should be modulated at less than a frame rate of the surveillance cameras. This will help to prevent information loss.

In the example of a hybrid system, a security control system could be provided that receives the decoded sensor information and generates security alarms. In other examples, the system could comprise a business logic system that receives the decoded sensor information and updates product availability information. In still another example, the system could further comprise an environmental control system that receives the decoded sensor information and controls environmental systems.

In general, according to another aspect, the invention features a monitoring method. This method comprises generating image data of scenes and detecting information concerning the scenes and encoding the information so that it can be derived from the image data. The image data is then analyzed and the information decoded.

In general, according to still another aspect, the invention features a method for analyzing image data from a surveillance camera. This method comprises installing mechanisms for generating predetermined optical patterns in response to events of interest in a scene monitored by the surveillance camera. The image data is then monitored for the predetermined optical patterns. Finally, metadata for the image data can be generated in response to detecting the optical patterns.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 4A shows an in-scene sensor with a four element array of signaling optical elements such as Light Emitting Diodes (LEDs) and FIG. 4B shows an in-scene sensor with a single signaling optical element (LED); FIG. 5A shows the use of temperature signals; FIG. 5B shows the use of door signals; FIG. 5C shows the use of water/humidity signals; FIG. 5D shows the use of merchandise signals; and FIG. 5E shows the use of audio signals.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms including the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
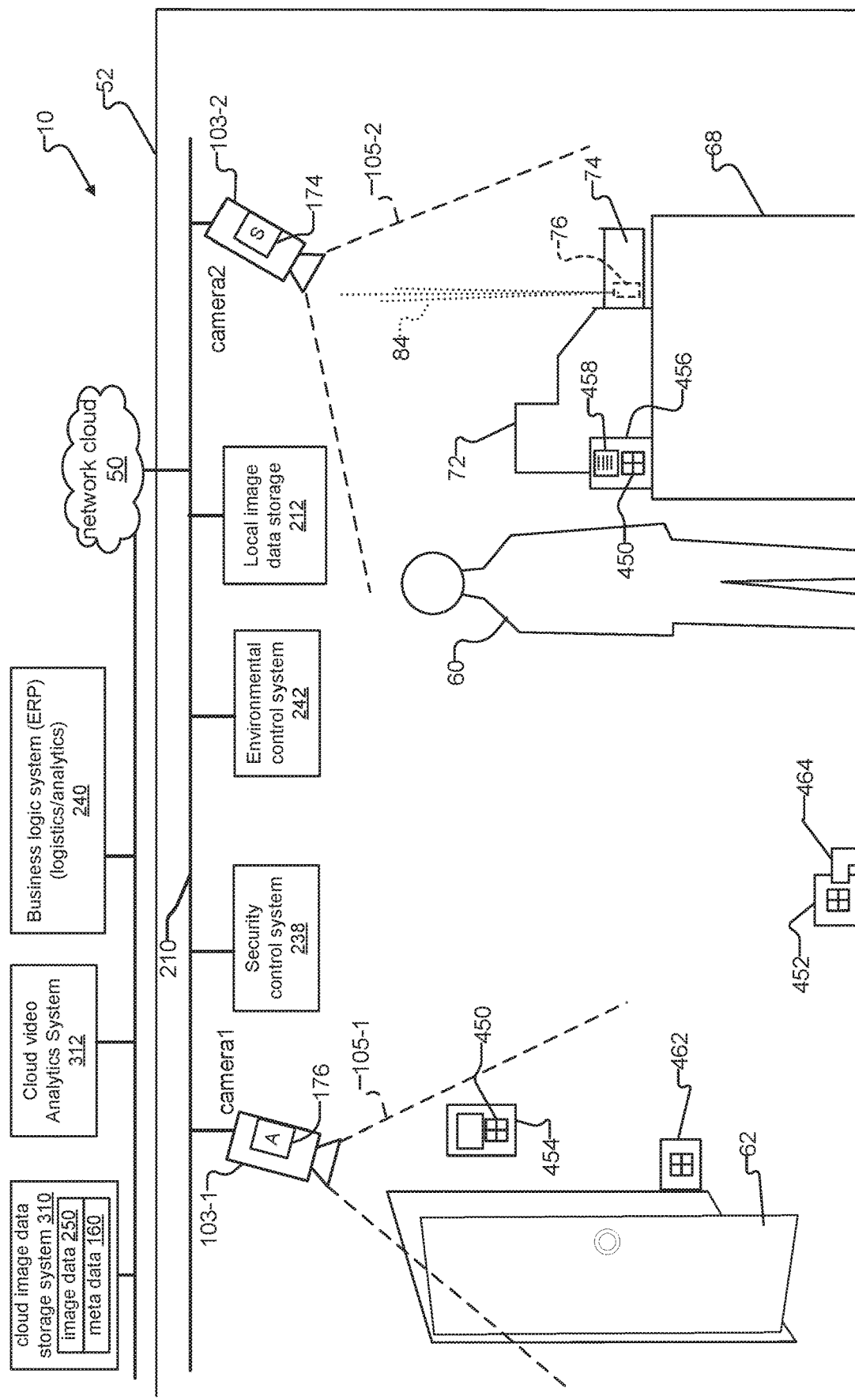
FIG. 1 is a schematic drawing showing a network of surveillance cameras including in-scene sensors.

FIG. 1 shows an exemplary system 10 comprising surveillance cameras and sensors constructed according to the principles of the present invention.

The system 10 includes surveillance cameras 103 installed at a premises 52 of an organization. The surveillance cameras 103 generate image data 250 and communicate with each other and with other security devices over a local (enterprise) network 210, which may be wired, wireless, or a hybrid of wired and wireless links.

A number of approaches may be employed in the alternative or in a hybrid fashion to store the image data 250 generated by the surveillance cameras 103-1, 103-2. A local image data storage system 212 is shown, deployed on the local network 210. In other examples, each or some of the cameras 103 includes a camera image data storage system 174. Further, streams of image data 250 can be transferred over a network cloud 50 to a cloud or remote image data storage system 310.

The image data 250 can then be accessed over the network cloud 50 by user mobile computing devices such as smartphones, tablet computing devices, laptop computer running operating systems such as Windows, Android, Linux, or IOS, in examples.

A specific example showing how the cameras might be deployed is illustrated. Within the premises 52, camera1 103-1 focuses upon a door 62. Camera2 103-2 detects motion of individuals 60 such as customers and/or sales personnel near a point of sale terminal (e.g. cash register 72) on a table 68, to illustrate one specific example.

Other components of the system 10 are the video analytics systems. A cloud video analytics system is shown 312 that receives the image data from the surveillance cameras 103 via the network cloud 50. Here, the cloud video analytics system 312 might be managed by a third party hosting company and is presented to the enterprise local network 210 as a single virtual entity, in one example. In other examples, the analytics system is installed on the local network 210 and may be owned by the same business entity as the surveillance camera system 10. Further, a camera analytics system 176 integrated within one or more of the surveillance cameras 103 is another option.

Also shown are various types of in-scene sensors that can be deployed in and around the premises 52. In the specific example shown, a temperature sensor/thermostat 454, a door sensor 462, a water/humidity sensor 452, an audio/voice sensor 456, and a cash register sensor 76 are provided. The cash register sensor 76 emits a light beam 84 when the drawer 74 is opened. Also shown are the various systems that can be targeted with the sensor information such as meta data 160 in the cloud image data storage system 310, business logic system 240 for logistics or analytics, a security control system 238 or an environmental control system 242.

In the example, the temperature sensor/thermostat 454 detects the ambient temperature and possibly other environmental quantities such as humidity. It is used to control heating and/or air conditioning units via and the environmental control system 242.

The door sensor 462, on the other hand, detects the state of the door 62. Specifically, it monitors whether the door 62 is opened or closed. In other examples, the door sensor 462 further detects the movement of individuals relative to the door such as detecting when individuals pass the threshold of the door 62.

A water/humidity sensor 452 is used to detect water on the floor of the premises 52, in one example. Specifically, it includes an integrated moisture detector 464 that tests for water on the floor of the premises 52, in the illustrated example. In another example, the detector 464 is a humidity sensor (e.g. hygrometer) that senses relative humidity in the air within the premises 52.

The audio/voice sensor 456 monitors for audible noises in the area of the point of sale terminal 72 in the illustrated example. The audio/voice sensor 456 includes a microphone 458 for this purpose. In one example, the audio/voice sensor 456 monitors speech for speech patterns that are that are indicative of aggression or fear. In this way, it can be used to detect whether or not there is a robbery going on or whether a supervisor needs to be summoned in order to handle an irate customer. In other examples, the audio/voice sensor 456 can detect sounds indicative of potential safety threats to the premises 52 and its occupants, such as shattering of glass, and noise that exceeds predetermined threshold levels. In yet another example, the audio/voice sensor 456 can sense sounds that are below the range of human hearing that travel long distances, such as infrasonic sounds for detecting earthquakes.

Also shown is a cash register sensor 76. It detects the status of the cash drawer 74 in this example. Specifically, the sensor 76 determines whether possibly money is contained in the cash drawer 74 or whether or not the cash drawer is opened or closed, in examples. In response to the determined conditions, the light beam 84 can be modulated at different frequencies and/or duty cycles corresponding to each of the determined conditions.

Each of the sensor units 454, 462, 452, 456, and 76 include visible communication units 450. These units 450 generate visible information that is at least visible to the surveillance cameras 103. This visible communication may also take place in optical bands that are visible to humans. In another example, the visible communication could also take place in infrared wavelengths, for example, that are outside the visible bands. In this example, surveillance cameras 103 equipped with image sensor that are sensitive to the infrared and can receive the visible information sent from the sensors over infrared wavelengths.

In any event, these visible communication units 450 are either directly or indirectly visible by the surveillance cameras 103 and typically located within the fields of view 105-1, 105-2 of the surveillance cameras. The information generated by the sensor units 454, 462, 452, 456, and 76 is then encoded and included within image data 250 of the scene captured by the surveillance cameras 103. In this way, the information from the sensors can be derived from the image data 250. As a result, one or more of the analytics systems 174, 310, for example, can analyze the image data 250 and decode the information from the sensors within the image data 250. This information can then be made available to the security control system 238, the environmental control system 242, and a business logic system 240, in examples.

A number of advantages arise from such a system. Specifically, data connections do not need to be made to any of the sensor units 454, 462, 452, 456, and 76. Because the sensors do not require connections to other components on the local network 210 to communicate the information from the sensors, the sensors can be designed without traditional data networking hardware and/or software protocol interfaces for transmitting the sensor information, which decreases complexity and cost and eases deployment. The data connections are instead implemented in the detection and analysis of the image data 250 from the surveillance cameras. Moreover, information from the sensors is further made available to the video analytics system. This allows for the information from the sensors to be used in the analytics system. Specifically, meta data 160 can be added to the image data 250 as it is stored in an image data storage system 310, 176. Moreover, the sensor information can now be distributed to the other heterogeneous systems that monitor or control the premises 52.

Figure 2:
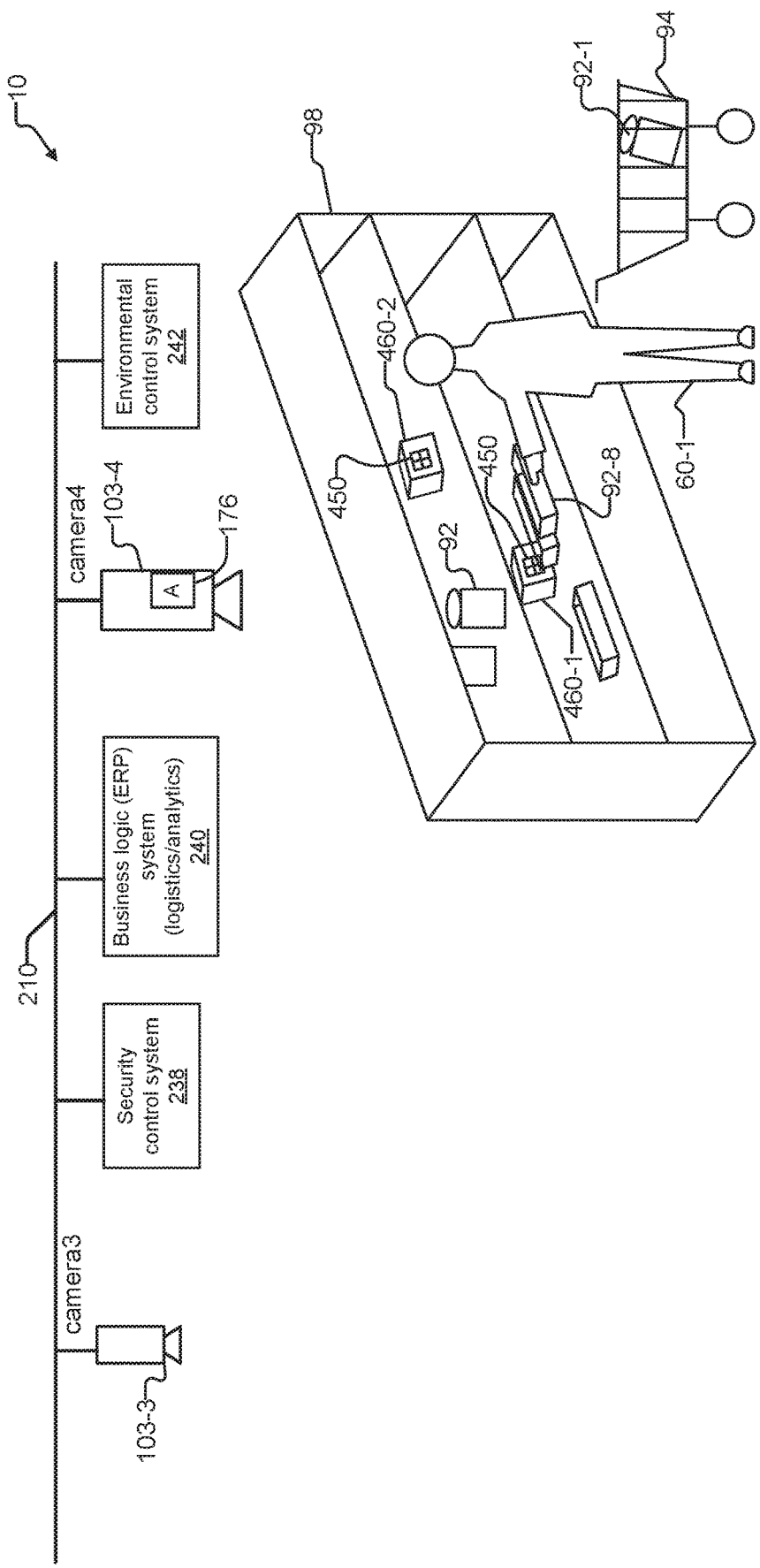
FIG. 2 is a schematic drawing showing a network of surveillance cameras including in-scene sensors in a retail environment.

FIG. 2 illustrates another example where the system 10 is deployed at a retail environment. In general, this figure is intended to show how the in-scene sensors can also be deployed to assist in the tracking of merchandise using merchandise sensors 460-1, 460-2. Here, the sensor information would generally be provided to the business logic system 240. Also illustrated here is the example where the analytics system and image data storage would be integrated into the cameras. Specifically, product sensors 460 are provided that monitor the status of products or merchandise located on shelves 98 within a retail establishment, for example.

Here, a surveillance camera 103-4-4 monitors product sensors 460-1 and 460-2. These products sensors 460 detect the number of boxes on the shelves 98 for different products. As a result, when a consumer 60-1 removes a product 92-8, this event can be detected by product sensor 460-1. Its communication unit 450 then visually encodes removal of the product, which the surveillance cameras 103 capture in image data 250. The analytics system 174 then decodes the image data 250 from the surveillance camera 103-1 to obtain the product removal information. The product removal information can then be made available to a business logic system 240 that maintains the inventory levels for the store. On the other hand, this information can also be provided to a security control system 238 to possibly notify sales personnel or security guards that a product has been removed from the shelves.

Figure 3:
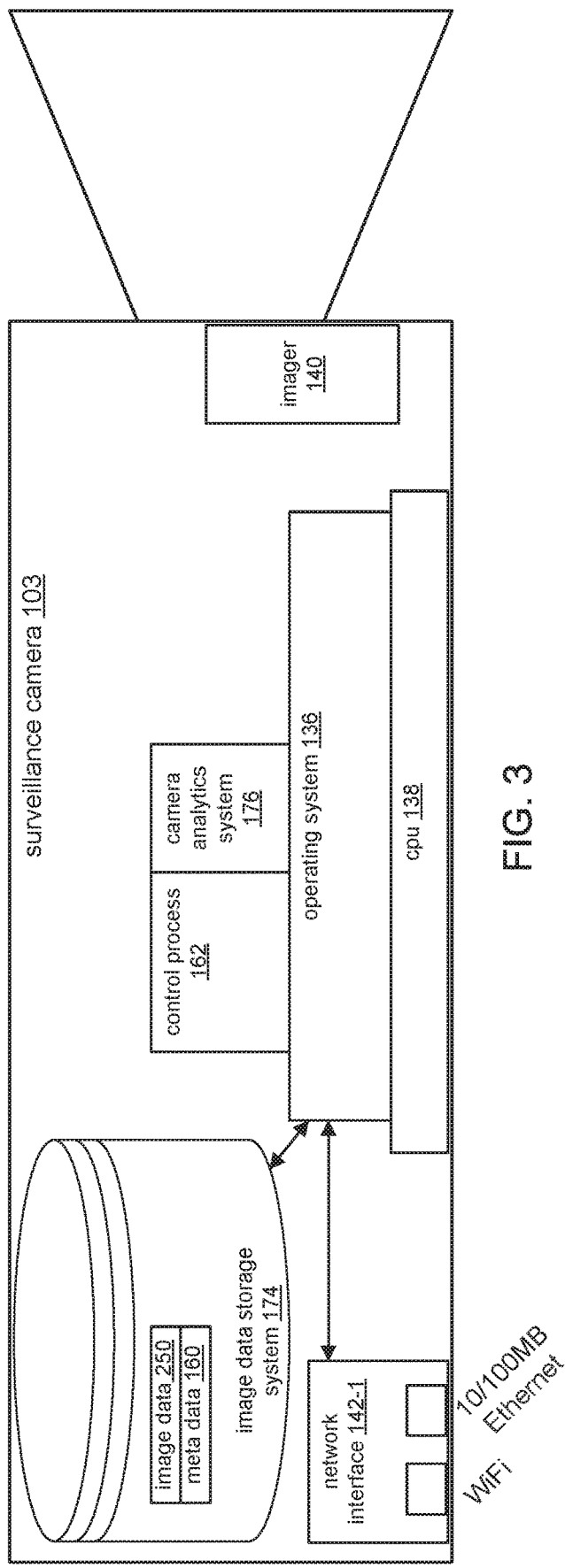
FIG. 3 is a schematic diagram showing the components of the surveillance cameras including an integrated analytics system and image data storage system.

FIG. 3 shows some of the components of an exemplary surveillance camera 103. In the example, the surveillance camera 103 stores its image data 250 locally and includes an integrated analytics system (here, a camera analytics system 176) as discussed herein above, for one embodiment.

The camera 103 includes a processing unit (CPU) 138, an imager 140, a camera image data storage system 174 and a network interface 142. An operating system 136 runs on top of the CPU 138. A number of processes or applications are executed by the operating system 136. The processes include a control process 162 and a camera analytics system 176.

The surveillance camera 103 saves image data 250 captured by the imager 140 to the camera image data storage system 174. Each camera 103 can support one or more streams of image data 250. The control process 162 receives and sends messages 264 via the network interface 142. The control process 162 also stores image data 250 and meta data 160 to the camera image data storage system 174.

The control process 162 sends the image data 250 to the integrated camera analytics system 176 for analysis in some cases. The camera analytics system 176 analyzes the image data 250 and generates meta data 160 in response to the analysis. The meta data 160 can also be stored to the camera image data storage system 174.

In some cases, the cameras 103 may also or alternatively stream image data to the user device 400 or the external analytics system 312 and these analytics systems then analyze the image data 250.

Figures 4A, 4B:
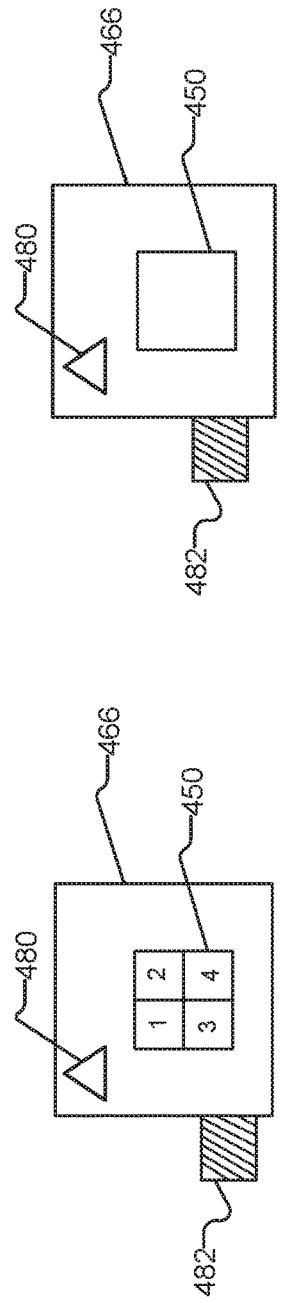
FIGS. 4A and 4B are schematic diagrams showing two examples of the in-scene sensors, where

FIG. 4A illustrates one example of a generic sensor 466 with its visible communication unit 450. In this example, the visible communication unit 450 comprises an array of 4 light emitting diodes (LEDs), for example. The light emitting diodes could generate light in the visible or non visible (to humans) regions of the infrared. Nevertheless, the surveillance cameras are able to detect the light from the diode array. The generic sensor 466 further includes a sensor controller 480 and a transducer 482 for detecting some characteristic of the surrounding environment. This transducer could be a microphone for detecting sound including noises indicative of aggressive speech, a moisture sensor for detecting water, and/or a temperature sensor for detecting temperature to list a few examples.

The information from the transducer 482 is accessed by the sensor controller 480. The sensor controller 480 then encodes the information through the modulation of the array of light emitting diodes. In another example, rather than light emitting diodes, light shutters or Liquid Crystal Displays (LCD) could be used. In any event, the controller 480 typically modulates the communications unit 450 at a modulation frequency that is less than the frame rate of the surveillance cameras 103. This minimizes the potential of data loss. Preferably, the modulation frequency of the communications unit 450 is less than half the frame rate of the surveillance cameras 103 to ensure robust communication of the sensor information with little or no lost information.

FIG. 4B shows another example of the sensor 466. This example includes only a single element communications unit 450. This could be a single light emitting diode, light shutter unit, or LCD display, for example.

FIG. 5A through 5E are flow diagrams intended to illustrate a number of different uses for in-scene sensors and how the information from the sensors is used. In each of the flow diagrams, an analytics system 312, 176 receives image data 250 captured from the surveillance cameras 103 and extracts information from the in-scene sensors encoded within the image data 250. The analytics system 312,176 then stores the extracted information from the sensors as meta data 160, saves the meta data 160 along with the meta data 160, and provides the meta data 160 for further processing by other components in the system in accordance with sensor-specific information associated with the meta data 160.

Figure 5A:
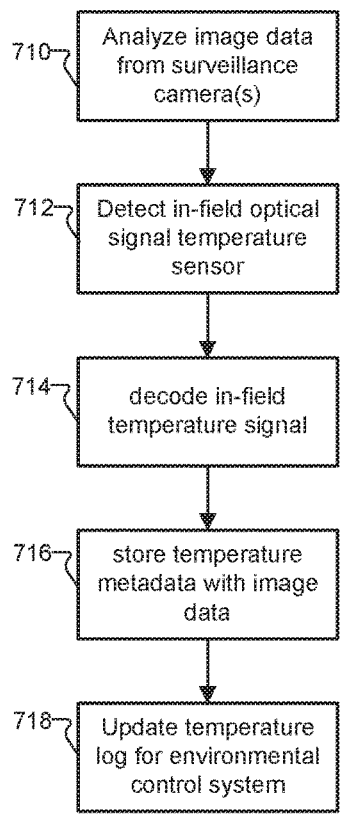
FIGS. 5A-5E are flow diagrams showing the processing of image data of the scenes and the decoding and targeting of the data from the in-scene sensors, where.

In FIG. 5A, the image data is analyzed from the surveillance cameras in step 710. An in-field optical signal from a temperature sensor 466 has been detected in step 712. The information from the in-field temperature sensor is decoded in step 714. In step 716, the temperature is stored as meta data 160 with the image data 250 in an image data storage system 174, 310. Finally, in step 718, this temperature information is passed to an environmental control system 242 and a temperature log is updated with the temperature information. In other examples, the temperature information is possibly stored in a log file within the image data storage system 174,310 or used as part of the control algorithm for that environmental control system 242.

Figure 5B:
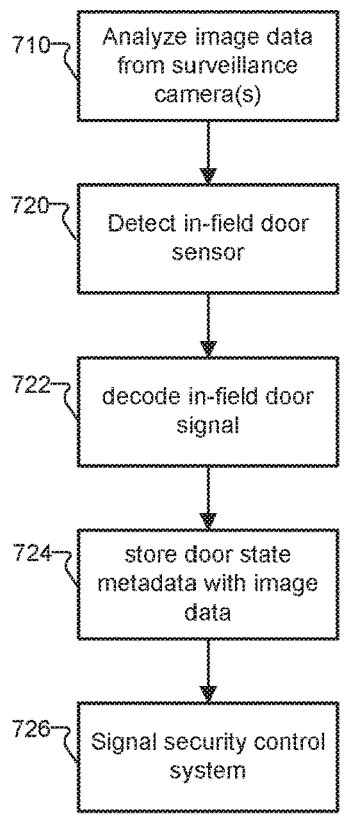

FIG. 5B shows a similar process in which an in-field door sensor 462 is monitored and detected in step 720. The information from the door sensor 462 is decoded in step 722. Meta data 160 describing the state of the door 62 is stored in step 724 along with the image data 250, for example. Finally, in step 726, the door state information is passed to a security control system 238.

Figure 5C:
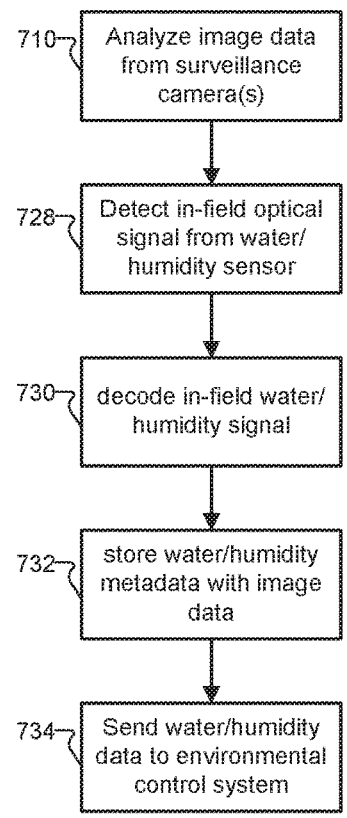

FIG. 5C shows a similar process in which an in-field optical signal from a water/humidity sensor 466 is monitored and detected in step 728. The information from the water/humidity sensor 466 is decoded in step 730. In step 732, the humidity information is stored as meta data 160 with the image data 250 in an image data storage system 174, 310. Finally, in step 734, the humidity information is passed to an environmental control system 242 and possibly stored in a log file within the image data storage system 174, 310 or used as part of the control algorithm for that environmental control system 242.

Figure 5D:
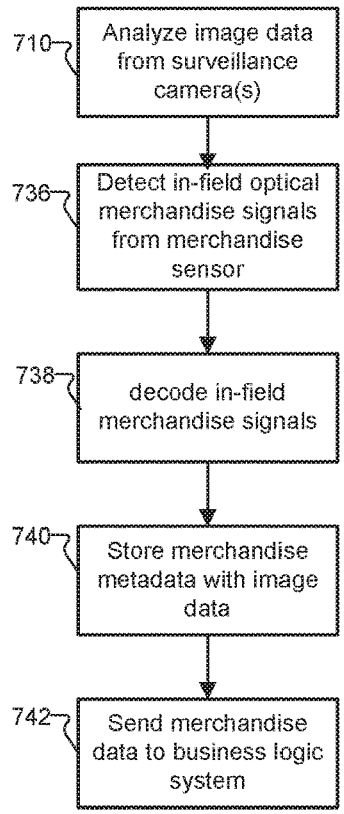

FIG. 5D shows a similar process in which an in-field optical signal from a merchandise sensor 460 is monitored and detected. The steps of the process of FIG. 5D are described with reference to an example consumer shopping event occurring in the scene of FIG. 2, where an individual selects product 92-8 from shelf 98.

With reference to the scene of FIG. 2, an individual 60-1 selects product 92-8 from shelf 98, for example. A merchandise sensor 460-1 detects this removal of the product 92-8. In response, the transducer 482 of the merchandise sensor 466 communicates merchandise signals such as aisle/shelf number, a code associated with product 92-8, and possibly time stamp information, in examples. The transducer 482 communicates this information by accordingly modulating the light of the diode array 450 as visible communications.

At the same time, camera4 103-4 captures image data 250 of the scene. Objects within the scene captured within the image data 250 include the individual 60-1, the shelf 98, and the in-scene merchandise sensor 460-1. The image data 250 also includes the visible communications (i.e. modulated merchandise signals) from the diode array 450 of the merchandise sensor 460-1 during the selection of the product 92-8 by the individual 60-1.

Returning to the method of FIG. 5D, in step 710, an analytics system 312,176 analyzes image data 250 captured from surveillance camera 103-4. Here, the image data 250 includes objects within the scene near the product shelf 98 and the encoded visible information (e.g. merchandise signals) sent from the merchandise sensor 460-1.

The analytics system 312,176 then detects the in-field optical merchandise signals from the merchandise sensor 460 within the image data, in step 736. The in-field merchandise signals are decoded in step 738. In step 740, the in-field merchandise signals are stored as merchandise meta data 160 along with the image data 250 to an image data storage system 174, 310. Finally, in step 742, the merchandise meta data 160 is passed to a business logic system 240 for logistics and analysis purposes. In examples, the merchandise meta data 160 is used by the business logic system 240 for restocking/replenishment purposes and to track sales of the products 92.

Figure 5E:
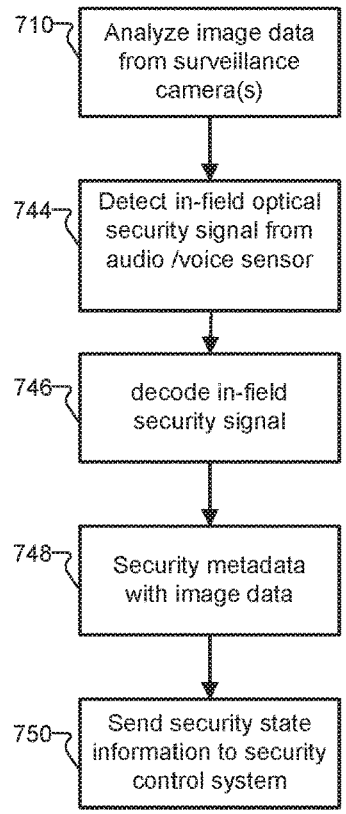

FIG. 5E shows a similar process in which an in-field audio signal from an audio sensor 466 such as a security microphone is monitored and detected. The steps of the process of FIG. 5E are described with reference to an example event involving an irate customer 60 near a point of sale terminal 72 in the scene of FIG. 1.

With reference to the scene of FIG. 1, an irate individual 60-1 speaks loudly and in a threatening manner towards a sales person at the point of sale terminal 72. A microphone 458 of an audio/voice sensor 456 detects speech patterns from the individual 60-1 that are indicative of threatening behavior. In response, in one example, the transducer 482 of the audio/voice sensor 456 communicates security signals such as point of sale terminal number, a code associated with the potentially threatening speech, and possibly time stamp information, in examples. The transducer 482 communicates this information by accordingly modulating the light of the diode array 450 as visible communications.

At the same time, camera2 103-2 captures image data 250 of the scene. Objects within the scene captured within the image data 250 include the individual 60, the point of sale terminal 72, and the in-scene audio/voice sensor 456. The image data 250 can also include the visible communications (i.e. modulated security signals) from the diode array 450 of the audio/voice sensor 456 during the irate display of behavior by the individual 60.

Returning to the method of FIG. 5E, in step 710, an analytics system 312,176 analyzes image data 250 captured from surveillance camera 103-2. Here, the image data 250 includes objects within the scene such as the point of sale terminal 72, the irate individual 60, the salesperson, and the encoded visible information (e.g. audio signals associated with irate customer 60) sent from the in-field audio/voice sensor 456.

The analytics system 312,176 then detects the in-field optical security signals from the audio/voice sensor 456 within the image data, in step 744. The in-field security signals are decoded in step 746. In step 748, the in-field security signals are stored as security meta data 160 along with the image data 250 to an image data storage system 174, 310. Finally, in step 750, security state information of the metadata 160 is passed to a security control system 238.

It is also important to note that the surveillance cameras 103 in conjunction with the sensors 462 452, 456, 76 can encode information within the image data 250 for later detection and analysis. For example, during the capturing of image data 250 of a scene, an integrated camera analytics system 176 of the camera 103 can detect and "pre-analyze" the visible information sent from the sensors. In response, the camera 103 can include (e.g. encode) additional information within the image data 250 for subsequent decoding.

In one example, because the cameras 103 are accessible over the local network 103 but the sensors typically are not, an installer can send updated information for a specific high value product over the local network 210 to the surveillance cameras 103. In the example, an incorrect Stock Keeping Unit (SKU) number was originally assigned to the product and is associated with a different, low-value product. Then, during capturing of image data 250, if an integrated camera analytics system 176 of the camera 103 detects visible information sent from a merchandise sensor 460 that indicates that the high-value product is selected, the camera analytics system 176 can encode additional information (e.g. meta data 160) within the image data 250 in response. For example, the camera analytics system 176 can include the updated Stock Keeping Unit (SKU) within the meta data 160 with of the image data 250. Subsequent analytics systems 312 can then read the meta data 160 to adjust the analysis of the image data in response. In this way, the system 10 is made more flexible and can better proactively respond to unforeseen conditions and/or limitations.

While this invention has been particularly shown and described with references to preferred embodiments thereof, it will be understood by those skilled in the art that various changes in form and details may be made therein without departing from the scope of the invention encompassed by the appended claims.

What is claimed is:

1. A system for monitoring sensors, the system comprising:
    surveillance cameras generating image data of scenes;
    sensors in the scenes that detect information concerning the scenes and encode the information wherein the information can be derived from the image data, the sensors including modulated light sources that are modulated to encode the information;
    an analytics system analyzing the image data and decoding light from the modulated light sources to obtain the information from the sensors; and
    an image data storage system for storing the image data, wherein the analytics system generates meta data from the decoded information and stores the meta data in connection with the image data to the image data storage system and
    wherein the sensors are configured to allow sensor-generated information to be included in the image data without the sensors being connected to network components by data networking hardware.

2. A system as claimed in claim 1, wherein the sensors detect environmental information and encode the environmental information.

3. A system as claimed in claim 1, wherein the sensors detect security information and encode the security information.

4. A system as claimed in claim 1, wherein the sensors detect business information and encode the business information.

5. A system as claimed in claim 1, wherein the modulated light source generates modulated light in the infrared spectrum.

6. A system as claimed in claim 1, wherein the modulated light source is modulated at less than a frame rate of the surveillance cameras.

7. A system as claimed in claim 1, wherein the modulated light source is modulated at less than half a frame rate of the surveillance cameras.

8. A system as claimed in claim 1, further comprising a security control system that receives the decoded sensor information and generates security alarms.

9. A system as claimed in claim 1, further comprising a business logic system that receives the decoded sensor information and updates product availability information.

10. A system as claimed in claim 1, further comprising an environmental control system that receives the decoded sensor information and controls environmental systems.

11. A monitoring method, comprising:
    generating image data of scenes;

detecting information concerning the scenes with sensors and encoding the information by modulating light sources of the sensors to encode the information wherein the information can be derived from the image data;

analyzing the image data and decoding the information;

storing the image data in an image data storage system along with meta data from the decoded information; and storing the meta data in connection with the image data to the image data storage system; and wherein the sensors are configured to allow sensor-generated information to be included in the image data without the sensors being connected to network components by data networking hardware.

12. A method as claimed in claim 11, wherein detecting information comprises detecting environmental information and encoding the environmental information.

13. A method as claimed in claim 11, wherein detecting information comprises detecting security information and encoding the security information.

14. A method as claimed in claim 11, wherein detecting information comprises business information and encoding the business information.

15. A method as claimed in claim 11, further comprising generating meta data from the decoded information and storing the meta data with the image data.

16. A method as claimed in claim 9, wherein the light source generates modulated light in the infrared spectrum.

17. A method as claimed in claim 9, wherein the light source is modulated at less than a frame rate of surveillance cameras that generated the image data.

18. A system for monitoring sensors, the system comprising:

surveillance cameras generating image data of scenes;

sensors in the scenes that detect business information concerning the scenes and encode the business information wherein the business information can be derived from the image data, wherein each of the sensors comprises a modulated light source that is modulated to encode the business information at less than half a frame rate of the surveillance cameras;

an analytics system analyzing the image data and decoding the business information from the sensors;

an image data storage system for storing the image data, wherein the analytics system generates meta data from the decoded business information and stores the meta data with the image data to the image data storage system; and a business logic system that receives the decoded business information and updates product availability information; and wherein the sensors are configured to allow sensor-generated information to be included in the image data without the sensors being connected to network components by data networking hardware.

19. A system as claimed in claim 1, wherein the modulated light source is modulated to encode the business information and a business logic system receives the decoded business information and updates product availability information.

20. A method as claimed in claim 11, wherein the modulated light source is modulated at less than half a frame rate of the surveillance cameras.

* * * * *